United States Patent
Stipe

(10) Patent No.: US 8,243,557 B2
(45) Date of Patent: Aug. 14, 2012

(54) OPTIMIZED RIDGE APERTURES FOR THERMALLY ASSISTED MAGNETIC RECORDING

(75) Inventor: Barry Cushing Stipe, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1124 days.

(21) Appl. No.: 11/645,459

(22) Filed: Dec. 26, 2006

(65) Prior Publication Data

US 2008/0151360 A1    Jun. 26, 2008

(51) Int. Cl.
*G02B 5/00* (2006.01)
(52) U.S. Cl. .................... 369/13.26; 359/350
(58) Field of Classification Search .................. 359/350; 369/13.26, 13.33, 47.5
See application file for complete search history.

(56) References Cited

U.S. PATENT DOCUMENTS

| | | | |
|---|---|---|---|
| 5,635,309 A * | 6/1997 | Takamori | 428/819.1 |
| 5,696,372 A | 12/1997 | Grober et al. | |
| 6,614,742 B2 | 9/2003 | Ucyanagi | |
| 6,649,894 B2 | 11/2003 | Matsumoto et al. | |
| 6,714,370 B2 | 3/2004 | McDaniel et al. | |
| 6,768,556 B1 | 7/2004 | Matsumoto et al. | |
| 6,785,445 B2 | 8/2004 | Kuroda et al. | |
| 6,795,380 B2 | 9/2004 | Akiyama et al. | |
| 6,839,191 B2 | 1/2005 | Sugiura et al. | |
| 6,950,260 B2 * | 9/2005 | Coffey et al. | 360/59 |
| 2003/0015651 A1 | 1/2003 | Kiguchi et al. | |
| 2003/0184903 A1 | 10/2003 | Challener | |
| 2003/0223316 A1 * | 12/2003 | Saga et al. | 369/13.33 |
| 2004/0062152 A1 | 4/2004 | Stancil et al. | |
| 2004/0257965 A1 * | 12/2004 | Miyanishi et al. | 369/121 |
| 2005/0007934 A1 * | 1/2005 | Ohta et al. | 369/112.23 |
| 2005/0030992 A1 | 2/2005 | Thornton et al. | |
| 2005/0030993 A1 | 2/2005 | Thornton et al. | |
| 2005/0031278 A1 * | 2/2005 | Shi et al. | 385/121 |

FOREIGN PATENT DOCUMENTS

| | | |
|---|---|---|
| JP | 2002063729 | 2/2002 |
| JP | 2002365416 | 12/2002 |
| WO | WO 01/17079 | 3/2001 |

OTHER PUBLICATIONS

Sendur et al., "Ridge waveguide as a near field aperture for high density storage", J. Appl. Phys., Sep. 1, 2004, vol. 96, No. 5.
Matteo et al., "Fractal extensions of near field aperture shapes for enhanced transmission and resolution", Optics Express, Jan. 24, 2005, vol. 13, No. 2.
Itagi et al., "Ridge waveguide as a near field optical source", Appl. Phys. Let., Dec. 1, 2003, vol. 83, No. 22.
Chen et al., "Imaging of optical field confinement in ridge waveguides fabricated on very small aperture laser", Appl. Phys. Let., Oct. 20, 2003, vol. 83, No. 16.

(Continued)

*Primary Examiner* — Joseph Haley
*Assistant Examiner* — Andrew Sasinowski
(74) *Attorney, Agent, or Firm* — D'Arcy H. Lorimer; Lorimer Labs

(57) ABSTRACT

Methods and devices for optimized ridge near field apertures for thermally assisted magnetic recording are disclosed. The aperture dimensions and supporting dielectric materials are optimized for maximum energy absorption at the magnetic recording layer for a light source having a wavelength of 780 nm, which can be produced by low cost laser diodes.

24 Claims, 11 Drawing Sheets

OTHER PUBLICATIONS

Matteo et al., "Spectral analysis of strongly enhanced visible light transmission through single C shaped nanoapertures", Appl. Phys. Let., Oct. 20, 2003, vol. 83, No. 16.

Shi et al., "Mechanisms for enhanced power throughput from planar nanoapertures for rear field optical data storage", Mar. 2002, Jpn. J. Appl. Phys., vol. 41.

Shi et al., "Ultra high light transmission through C shaped nanoaperture", Optics Letters, Aug. 1, 2003, vol. 28, No. 15.

Shi et al., "Design of a C aperture to achieve lambda/10 resolution and resonant transmission", J. Opt. Soc. Am. B, Jul. 2004, vol. 21, No. 7.

Sun et al., "Topology visualization of the optical power flow through a novel C-shaped nano aperture", IEEE Visualization 2004, Oct. 10-15, 2004.

Xu et al., "Investigation of the near field distribution at novel nanometric aperture laser", IUMRS-ICEM 2002, Jun. 10-14, 2002.

\* cited by examiner

OPTIMIZED RIDGE APERTURES FOR THERMALLY ASSISTED MAGNETIC RECORDING

BACKGROUND OF THE INVENTION

1. Field of the Invention

This invention relates to devices for generating near-field light. More particularly, the present invention relates to methods and structures for generating optimized near-field light for thermally assisted magnetic recording.

2. Description of the Related Art

Near-field light sources are useful for generating subwavelength, intense light for use in optical microscopes, optical measurement instruments, spectroscopic instruments, optical recording and optical reproduction equipment, lithography equipment, and for thermally assisted magnetic recording. In the latter application, heat is applied to a magnetic substrate via a very small, but intense light source to reduce the anisotropy of fine grain magnetic structures. These fine grain structures are capable of high recording densities, but have an anisotropy at room temperature that is too high for typical magnetic fields produced by conventional recording heads. Heating allows the media to be written with field strengths of conventional heads. Another potential advantage is that lower field strengths produced by heads having broader field dimensions may also be used, which relaxes the tight dimensional requirements of the magnetic source or write head. However, to be useful for high density recording, the light source utilized for heating must be on the order of 50 nm or less in diameter. This is far beyond the optical diffraction limit for conventional light sources such as solid state lasers.

One method that commonly used to produce such a near-field light source is the ridge aperture or "C" shaped aperture. The device consists of rectangular shaped aperture placed in an electrically conductive metal film, which is supported on a transparent substrate. The substrate is transparent to the wavelength of incident radiation, and covers the area of the aperture. Extending into the center portion of the aperture is an electrically conductive ridge, generally an extension of the surrounding metal film. Incident radiation, polarized in the direction parallel to the ridge produces a near-field light source which appears close to or at the end of the ridge, in the gap between the end of the ridge and the opposing boundary of the aperture. Numerous prior art references have described the formation of near field light sources using ridge apertures, many of which are summarized below. It is clear from these publications that intensity of the near field light source depends strongly on: (1) the particular dimensions of the aperture, which include the length and width of the outer boundary as well as the length and width of the ridge; (2) the thickness and composition of the metal film surrounding the aperture; and, (3) the frequency of light used to illuminate the aperture. For thermally assisted recording, heating of the recording media is of prime importance, so besides the variables cited above, the absorption characteristics of the media and location of the near-field light source above the media become additional parameters of importance. Most practitioners skilled in the art disclose information dealing with efficiency of the apertures, which is computed from the ratio of the light flux impinging on the entire aperture to the flux generated by the near-field source, with little regard to the impact of adsorption efficiency within the media being heated by the near-field source. Furthermore, since cost is always a concern in today's mass storage device technology, it would be useful to build a device to produce near-field light sources utilizing 780 nm wavelength light emitting diode light sources, which are low cost devices.

What is needed is a device for producing near field light sources for use in thermally assisted magnetic recording applications, optimized for low cost 780 nm wavelength illumination light sources, that is also optimized for maximum adsorption efficiency by the recording media.

Sendur et al., in an article entitled "Ridge waveguide as a near-field aperture for high density data storage", Journal of Applied Physics, Volume 96, No. 5, September 2004, discloses the performance of the ridge waveguide as a near-field aperture in data storage systems. Finite element method (FEM) and finite-difference time-domain (FDTD) based software are used in the numerical simulations. To verify accuracy at optical frequencies, the FEM and FDTD are first compared to analytical results. The accuracy of these techniques for modeling ridge waveguides at optical frequencies is also evaluated by comparing results with plane wave illumination. The FEM, which is capable of modeling focused beams, is then used to simulate various geometries involving ridge waveguides. Near-field radiation from ridge waveguide transducer is expressed in terms of power density quantities. Previous studies in the literature consider the performance of the transducer in free space, rather than in the presence of a recording magnetic medium. The effect of the recording magnetic medium on the transmission efficiency and spot size is discussed using numerical simulations. The effect of various geometric parameters on the optical spot size and transmission efficiency is investigated and discussed. Based on our numerical simulations, a promising transducer design is suggested to obtain intense optical spots well below the diffraction limit. Numerical simulations suggest that a full width at half maximum spot diameter of 31 nm in the recording magnetic medium can be obtained. The maximum value of the absorbed optical power density in the recording medium is about $1.67 \times 10^{-4}$ mW/nm$^3$ for a 100 mW input power. This adsorbed power density is reported for a wavelength of 516 nm and silver conductive films. In-track and cross-track profiles for this design are compared with Gaussian distributions.

Batra et al., in an article entitled "Topology Visualization of the Optical Power Flow through a Novel C-Shaped Nano-Aperture", published in IEEE Visualization 2004, discloses a study describing the application of flow topology visualization techniques to the investigation of optical transmission through a novel C-shaped metal nano-aperture. This feature based vector field visualization technique can be extended generally to the flourishing field of Finite-Difference-Time-Domain (FDTD) methods used in many nano-photonics problems. Because of the diverse applications of the FDTD method and the vast amount of information it produces, an effective high-level abstraction of the data set can not only provide critical insight into the physical phenomena, it will also help direct ongoing research efforts. Recently discovered C-shaped sub-wavelength (nano) metallic apertures, when irradiated at specific resonance frequencies, have extraordinary power transmission five to six orders of magnitude beyond what is observed for conventional round or square apertures. These apertures produce optical spot sizes as small as 25-50 nm using visible light in the near-field of the aperture with a brightness 10-100 times higher than that of the illuminating beam.

Shi et al., in an article titled "Design of a C Aperture to Achieve λ/10 Resolution and Resonant Transmission", published in J. Opt. Soc. Am. B, vol. 21, No. 7, July 2004, discloses small subwavelength apertures providing high spatial resolution that is not limited by the diffraction limit. However, application of these apertures to practical problems has been hindered by the critical problem of extremely low power transmission efficiency. A well-designed C aperture can provide both a high spatial resolution of $\lambda/10$ and a high power throughput greater than 1. The authors present the underlying design ideas of the C aperture and report interesting general properties of optical transmissions through a single two-dimensional subwavelength aperture, based on numerical finite-difference time-domain simulations and fundamental observations. These results are expected to provide helpful information for both C aperture applications and general studies of subwavelength metallic structures.

Shi et al., in an article entitled "Ultrahigh Light Transmission Through a C-shaped Nanoaperture", published in Optics Letters, Vol. 28, No. 15, Aug. 1, 2003, discloses that optical resolution beyond the diffraction limit can be achieved by use of a metallic nanoaperture in a near-field optical system. Conventional nanoapertures have very low power throughput. Using a numerical finite-difference time domain method, the authors discovered a unique C-shaped aperture that provides ~3 orders of magnitude more power throughput than a conventional square aperture with a similar near-field spot size of ~$\lambda/10$. Microwave experiments at 6 GHz quantitatively confirmed the simulated transmission enhancement. The high transmission of the C-aperture, or one of the related shapes, is linked to both a propagation mode in the aperture and local surface plasmons.

Shi et al., in an article entitled "Mechanisms for Enhancing Power Throughput from Planar Nano-Apertures for Near-Field Optical Data Storage", published in J. Appl. Phys., Vol 41(2002), pp 1632-1635, discloses that near field optical data storage systems are important for ultrahigh density data storage. One type of near field optical data storage system uses a planar nanoaperture to define the data storage resolution. However, conventional nano-apertures have a tradeoff between resolution and power throughput. A "C" aperture design has been recently reported to overcome this problem. A study on the mechanisms for power throughput enhancement, based on a detailed study of nanoslits using numerical simulations is presented. Generating a propagation mode is essential for high power throughput, and by optimizing the design of the aperture thickness, resonant transmission can be achieved for even higher power throughput.

Matteo et al., in an article entitled "Fractal extensions of near-field aperture shapes for enhanced transmission and resolution", published in Optics Express, Vol. 13, No. 2, Jan. 24, 2005, discloses families of fractals investigated as near-field aperture shapes. They are shown to have multiple transmission resonances associated with their multiple length scales. The higher iterations exhibit enhanced transmission, and spatial resolution exceeding the first order. Near-field enhancements of greater than 400 times the incident intensity and resolutions of better than $\lambda/20$ have been shown with apertures modeled after third iteration prefractals. Enhancements as large as 1011 have been shown, when compared with conventional square apertures that produce the same spot size. The effects of the complex permittivity values of the metal film are also addressed.

Matteo et al., in an article entitled "Spectral analysis of strongly enhanced visible light transmission through single C-shaped nanoapertures", published in App. Phys. Letters, Vol. 35, No. 4, Jul. 26, 2004, discloses single C-shaped apertures designed, fabricated, and characterized in an Au film, resonant in the visible regime. The C-shaped apertures showed transmission enhancement of 13-22 times over a square aperture of the same area and suggest as high as 106 times enhancement over square apertures that are designed to produce the same near-field spot size. Spectra from individual apertures demonstrate the ability to tune this resonance over 70 nm by scaling the dimensions of the apertures. This shows the C aperture to be a versatile tool for gaining high-resolution, enhanced transmission through single subwavelength apertures at optical wavelength.

Chen et al., in an article entitled "Imaging of optical field confinement in ridge wave guides fabricated on very-small-aperture laser", published in App. Phys. Letters, Vol. 83, No. 16, Oct. 20, 2003, discloses the optical field confinement in a ridge wave guide nano-structure ("C" aperture) designed for ultrahigh-density recording, observed using an apertureless near-field scanning optical microscope. The aperture was fabricated on a commercial edge-emitting semiconductor laser as the light source. High-contrast near-field images at both 1× and 2× lock-in detection frequencies were obtained. The emission patterns are in agreement with theoretical simulation of such structures. A 90 nm×70 nm full width half maximum spot size was measured and is comparable to the ridge width of the aperture.

Itagi et al., in an article entitled "Ridge waveguide as a near-field optical source", published in App. Phys. Letters, Vol. 83, No. 22, Dec. 1, 2003, discloses the feasibility of using a ridge waveguide at optical frequencies as a near-field optical transducer, using the finite difference time domain method. The complete electromagnetic field picture of the ridge waveguide, in the absence and presence of the irradiated medium, is presented. A power efficiency of 7% and an optical spot with full width half maximum of 50 nm×80 nm is obtained in the medium. We show that impedance considerations play a major role in the transducer-medium optical coupling.

U.S. Pat. No. 5,696,372 discloses a near-field electromagnetic probe that converts an incident energy beam into an interrogating beam which exhibits, in the near-field vicinity of the probe, a transverse dimension that is small in relation to the wavelength of the incident energy beam. The probe comprises an energy source for providing the incident energy beam with a wavelength $\lambda$. An antenna is positioned in the path of the incident energy beam and comprises at least a first conductive region and a second conductive region, both of which have output ends that are electrically separated by a gap whose lateral dimension is substantially less than $\lambda$. The electromagnetic system which produces the incident energy should preferably have its numerical aperture matched to the far-field beam pattern of the antenna. Further, the incident beam should have a direction of polarization which matches the preferred polarization of the antenna. The near-field probe system of the invention can also sense fields in the near-field gap and reradiate these to a far-field optical detector. Thus the probe can serve to both illuminate a sample in the near-field gap, and to collect optical signals from an illuminated sample in the near-field gap.

U.S. Pat. No. 6,649,894 discloses an optical near-field probe of high resolution and high efficiency. A near-field light is generated using a tapered, plane scatterer formed on a substrate surface. The intensity of the near-field light is enhanced by making the area of the scatterer smaller than that of a light spot and by selecting the material, shape, and size of the scatterer so as to generate plasmon resonance. An optical near-field generator having a high light utilization efficiency can be obtained.

U.S. Pat. No. 6,714,370 discloses a recording head for use in conjunction with a magnetic storage medium, comprising a waveguide for providing a path for transmitting radiant energy, a near-field coupling structure positioned in the waveguide and including a plurality of arms, each having a planar section and a bent section, wherein the planar sections are substantially parallel to a surface of the magnetic storage medium, and the bent sections extend toward the magnetic storage medium and are separated to form a gap adjacent to an air bearing surface, and applies a magnetic write field to sections of the magnetic recording medium heated by the radiant energy. A disc drive including the recording head and a method of recording data using the recording head are also provided.

U.S. Pat. No. 6,768,556 discloses a near-field probe including a metallic scatterer fabricated on a substrate in a contour of a circular cone, a polygonal pyramid, a planar ellipse, or a triangle and a film of a metal, a dielectric, or a semiconductor formed in a periphery of the scatterer with film thickness equal to height of the scatterer.

U.S. Pat. No. 6,785,445 discloses a near-field light probe capable of emanating a near-field light having a sufficient intensity while allowing reduction of aperture size to improve resolution. The near-field light probe can be incorporated in a near-field optical microscope, a near-field light lithography apparatus, and a near-field light storage apparatus. A near-field light probe has a configuration in which a light-blocking film is formed with an aperture having slits surrounding the major opening. Light emitted from a light source is coupled into the probe from one side of the light-blocking film, the light being polarized in a predetermined direction with respect to the slits so that a near-field light emanates from the major opening.

U.S. Pat. No. 6,795,380 discloses a pair of members opposed to each other via a gap which are commonly used as an evanescent light probe and a writing magnetic head. When the spacing and width of the gap are smaller than the wavelength λ of injected light, highly intensive evanescent light is generated from the gap position of the opposite surface. Magnetic writing is carried out by applying a recording magnetic field from the pair of members to a medium heated by the evanescent light.

U.S. Pat. No. 6,839,191 discloses an optical near-field generating element provided with: a light shielding member, which is placed on an optical path of light emitted from a light source, for defining a micro opening having a diameter equal to or shorter than a wavelength of the light; and a dielectric film placed in close contact with the micro opening. Alternatively, an optical near-field generating element is provided with a light shielding member, which is placed on an optical path of lights emitted from a light source, for defining a micro opening having a diameter equal to or shorter than a wavelength of the light, the shielding member equipped with: a main portion for defining a basic shape of the micro opening; and a protrusion portion protruding from the main portion toward the center of the micro opening.

US Patent Application Publication 2003/0015651 discloses optical apparatuses using the near-field light where high spatial resolution and high sensitivity are made compatible. Highly intense near-field light is generated in a narrow area using localized plasmons that are produced in a metal pattern in the shape that bears anisotropy and is made to irradiate a measured subject. The direction of polarization of incident light is modulated and signal light is subjected to synchronous detection, so that background light is removed and high sensitivity is achieved.

US Patent Application Publication 2003/0184903 discloses a ridge wave guide having a recessed ridge forming an isolated tip at a terminal end of the wave guide's aperture which efficiently couples light into a spot adjacent to the tip in a medium below the terminal end of the wave guide that is significantly smaller than the light's wavelength. The wave guide is used to heat a recording medium via the small spot for heat assisted recording or to pattern substrates by photolithography with line width exposures that are significantly smaller than the wavelength of light. The body of the wave guide may also be recessed away from the medium in an area surrounding the wave guide's aperture to further confine the energy emerging from the wave guide to the small spot adjacent the tip in the medium.

US Patent Application Publication 2003/0223316 discloses a recording head for decreasing recording noise accompanying malformation of a recorded mark and the formation of a recorded mark capable of increasing reproduction resolution at the time of magnetic reproduction. The head has a light source and a scatterer for recording information on a recording medium by generating near-field light by application of light from the light source and forming a magnetic domain array on the recording medium, a perimeter of the scatterer defines a plurality of vertices and a distance between a first vertex and a last vertex is shorter than the width of the recording track on the recording medium. The recording head improves recording density and can be used to manufacture a highly reliable information recording and reproducing apparatus having a reduced cost per capacity.

US Patent Application Publication 2004/0062152 discloses a device for writing data to a recording medium and a method for fabricating the device. According to one embodiment, the device includes an electrical conductor having a cross-track portion, wherein the cross-track portion includes first and second opposing surfaces, and wherein the cross-track portion defines an aperture extending from the first surface to the second surface. The device also includes a dielectric portion disposed in the aperture such that the dielectric portion defines a ridge waveguide having a lowest-order mode cut-off frequency that is less than the frequency of incident optical energy used to heat the recording medium.

US Patent Application Publication 2005/0031278 discloses near-field sub-wavelength C-apertures that provide enhanced spatial resolution and power throughput by increasing the normalized resonant wavelength of the aperture. These improved apertures are characterized by the use of improved geometric proportions for C-apertures, filling the aperture with high-index material, designing aperture thickness to produce longitudinal transmission resonance, and/or tapering the aperture in the longitudinal direction to achieve impedance matching. Apertures according to the present invention may be used for many technological applications in various portions of the electromagnetic spectrum. Exemplary applications to high density optical data storage and optical particle trapping and manipulation are described.

US Patent Application Publications 2005/0030992 and 2005/0030993 disclose a near field optical apparatus comprising a conductive sheet or plane having an aperture therein with the conductive plane including at least one protrusion which extends into the aperture. The location, structure and configuration of the protrusion or protrusions can be controlled to provide desired near field localization of optical power output associated with the aperture. Preferably, the location, structure and configuration of the protrusion are tailored to maximize near field localization at generally the center of the aperture. The aperture preferably has a perimeter dimension which is substantially resonant with the output wavelength of the light source, or is otherwise able to support a standing wave of significant amplitude. The apparatus may be embodied in a vertical cavity surface emitting layer or VCSEL having enhanced nearfield brightness by providing a conductive layer on the laser emission facet, with, a protrusion of the conductive layer extending into an aperture in the emission facet. The aperture in the emission facet preferably has dimensions smaller than the guide mode of the laser, and the aperture preferably defines different regions of reflectivity under the emission facet. The depth of the aperture can be etched to provide a particular target loss, and results in higher optical power extraction from the emission facet.

International Publication WO 01/17079 discloses a near-field optical apparatus comprising a conductive sheet or plane having an aperture therein, with the conductive plane including at least one protrusion which extends into the aperture. The location, structure and configuration of the protrusion or protrusions can be controlled to provide desired near-field localization of optical power output associated with the aperture. Preferably, the location, structure and configuration of the protrusion are tailored to maximize near-field localization at generally the center of the aperture. The aperture preferably has a perimeter dimension which is substantially resonant with the output wavelength of the light source, or is otherwise able to support a standing wave of significant amplitude. The apparatus may be embodied in a vertical cavity surface emitting layer or VCSEL having enhanced near-field brightness by providing a conductive layer on the laser emission facet, with a protrusion of the conductive layer extending into an aperture in the emission facet. The aperture in the emission facet preferably has dimensions smaller than the guide mode of the laser, and the aperture preferably defines different regions of reflectivity under the emission facet. The depth of the aperture can be etched to provide a particular target loss, and results in higher optical power extraction from the emission facet.

SUMMARY OF THE INVENTION

It is an object of the present invention to provide an optical device for generating a near-field light source containing a conductive metal film, a ridge aperture fashioned in the conductive metal film, and a light source capable of producing light having wavelengths between 770 and 800 nm, the light source illuminating at least a portion of the ridge aperture.

It is another object of the present invention to provide an optical recording device containing a conductive metal film, a ridge aperture fashioned in the conductive metal film, and a light source capable of producing light having wavelengths between 770 and 800 nm, the light source illuminating at least a portion of the ridge aperture. The device further contains a media substrate proximate to the conductive metal film, wherein the light source produces an adsorbed surface power density greater than $2 \times 10-4$ mW/nm3 within the media substrate with a light source having an incident power density of 100 mW/µm2.

It is another object of the present invention to provide a method for generating a near-field light source including fashioning a ridge aperture within a conductive metal film, and illuminating at least a portion of the ridge aperture with light having a wavelength between 770 and 800 nm.

It is yet another object of the present invention to provide a method for thermally assisted recording including fashioning a ridge aperture within a conductive metal film, illuminating at least a portion of the ridge aperture with light having a wavelength between 770 and 800 nm, and producing a near-field light source with the ridge aperture. the method further includes heating a media substrate proximate to the conductive film with the near-field light source, where the near-field light source produces an adsorbed surface power density greater than $2 \times 10-4$ mW/nm3 within the media substrate with an incident light power density of 100 mW/µm2.

BRIEF DESCRIPTION OF THE DRAWINGS

The present invention will be better understood when consideration is given to the following detailed description thereof. Such description makes reference to the annexed drawings, wherein.

DETAILED DESCRIPTION OF THE PREFERRED EMBODIMENTS

Figure 1A:
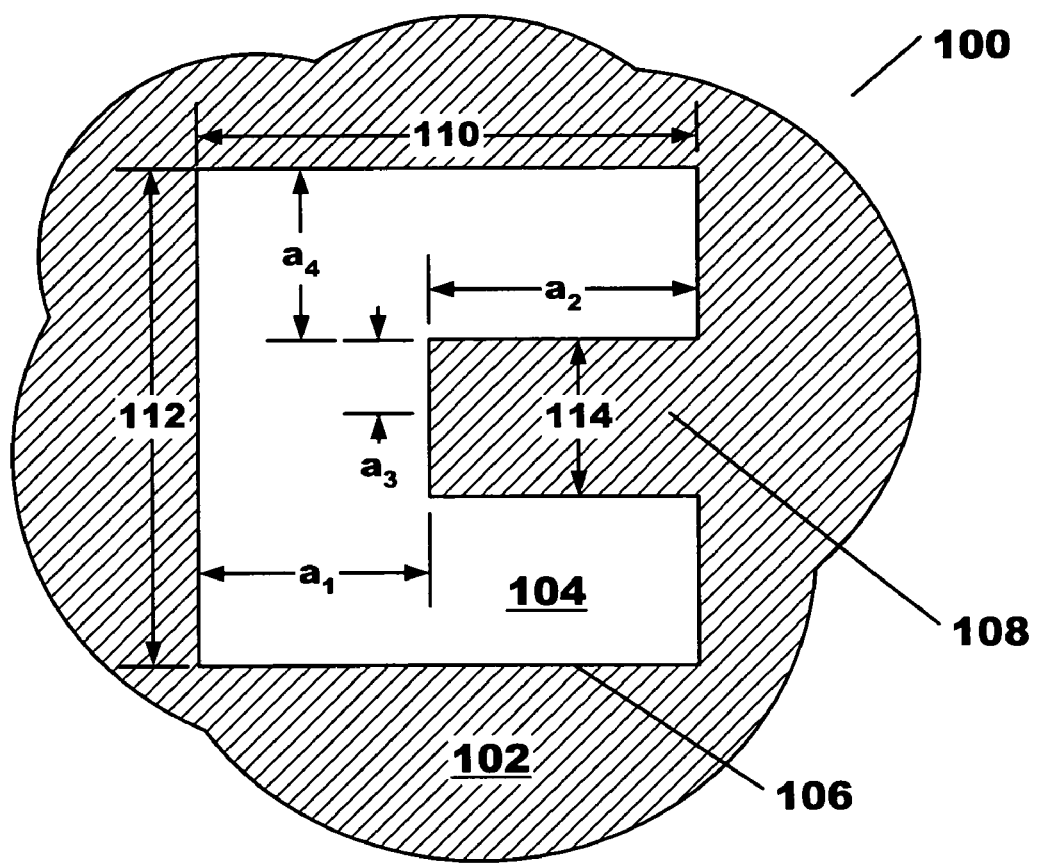
FIGS. 1*a*, 1*b* are partial, schematic plan views of a ridge near-field aperture showing the impact of incident light polarization on the formation of a near-field light source, in accordance with an embodiment of the present invention.
Figure 1B:
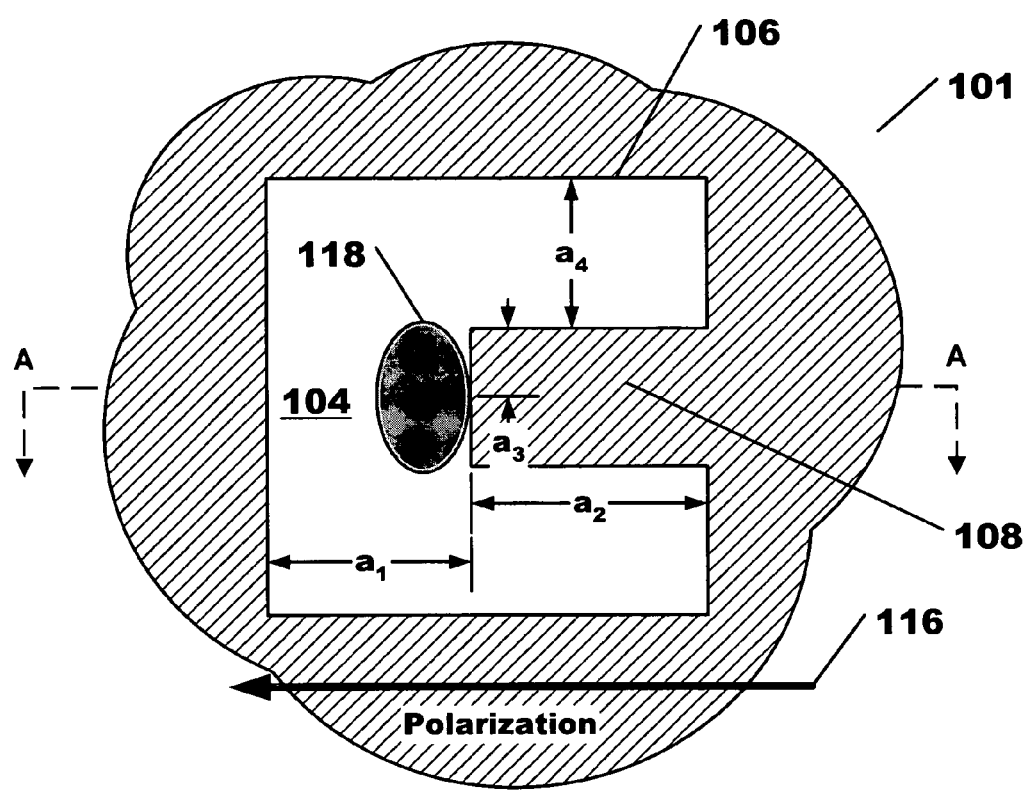

FIG. 1*a* is a partial, schematic plan view 100 of a ridge near-field aperture 106, in accordance with an embodiment of the present invention. This device is also known as a "C" aperture. The device consists of rectangular shaped aperture of width 110 and length 112 placed in an electrically conductive metal film 102, which is supported on a transparent dielectric substrate. For the purposes of discussion within this specification, a transparent dielectric is one which transmits at least a portion of an impinging light source at the wavelength of the light source. Such materials may be opaque at one wavelength, but transparent at another wavelength. Extending into the center portion of aperture is an electrically conductive ridge 108, generally an extension of the surrounding metal film 102. The ridge 108 extends a distance $a_2$ into the aperture, having a width 2×dimension $a_3$. The gap is dimension $a_1$, which is the distance from the end of ridge 108 to the opposite boundary of the aperture. Dimension $a_4$ locates the horizontal position of the ridge 108. Preferably, ridge 108 is centered within the aperture, such that $a_4+a_3=\frac{1}{2}$ length 112. The width 110 of the aperture is the sum of dimensions $a_1$ and $a_2$. With respect to embodiments of the present invention, it is important to recognize that the ridge aperture 106 is a three dimensional volume, having a cross sectional area represented by plan views of aperture 106, as shown in FIGS. 1a and 1b, and a depth equal to approximately the thickness of the conductive film defining aperture 106. The volume of aperture 106 is filled with a transparent dielectric 104, which may or may not be the same transparent dielectric supporting conductive film 102. Further details are disclosed below in FIGS. 2a, 2b.

FIG. 1b is partial, schematic plan view 101 of a ridge near-field aperture 106 showing the impact of incident light polarization on the formation of a near-field light source 118, in accordance with an embodiment of the present invention. Incident radiation (not shown), polarized in the direction indicated by arrow 116, parallel to ridge 108, produces a near-field light source 118 which appears close to or at the end of ridge 108, in the gap $a_1$ between the end of ridge 108 and the opposing boundary of the aperture.

Figure 2A:
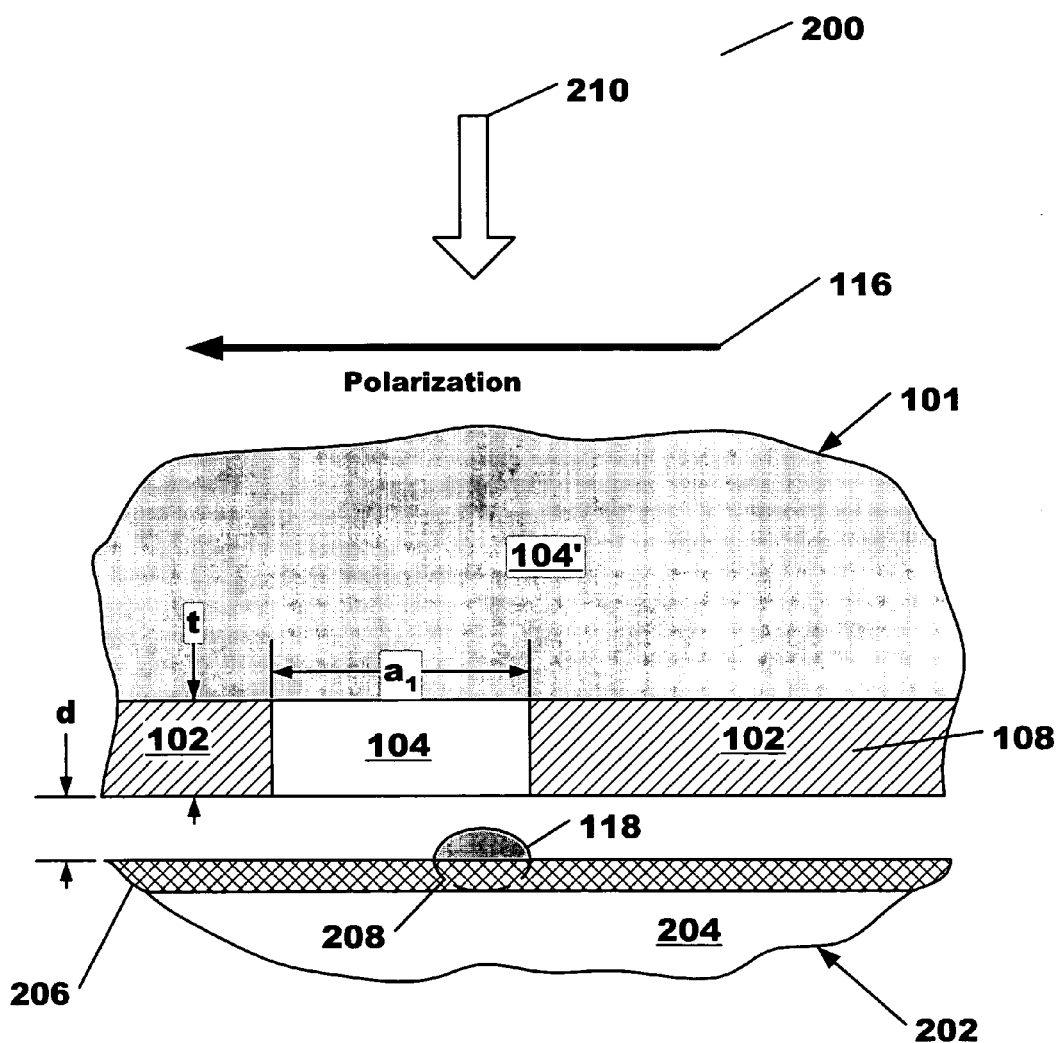
FIG. 2*a* is a partial, cross sectional view through section A-A of FIG. 1*b* showing the heating of a media substrate oriented below the ridge near-field aperture of FIG. 1*b*, for two separate dielectric materials 104, 104', in accordance with an embodiment of the present invention.
Figure 9:
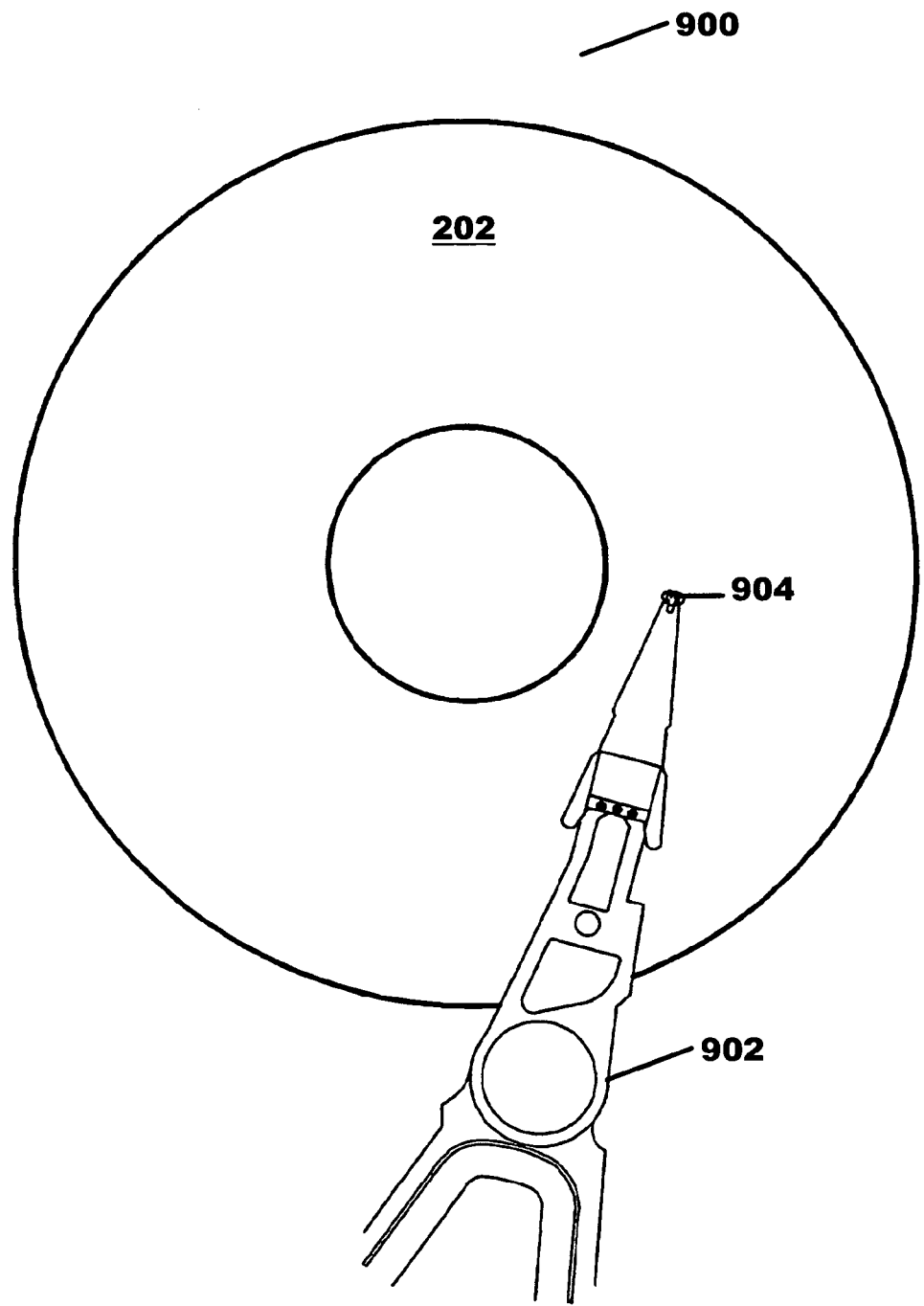

FIG. 2a is a partial, cross sectional view 200 through section A-A of FIG. 1b showing the heating of a media substrate 202 oriented below the ridge near-field aperture of FIG. 1b, for two separate dielectric materials 104, 104', in accordance with an embodiment of the present invention. This figure illustrates the placement of near field aperture proximate to a media substrate 202 having a magnetic recording layer 206 disposed on a support substrate 204. Near field light source 118 is directed onto the surface of magnetic recording layer 206, providing localized heating of the layer. A broadly focused magnetic field (not shown), having dimensions greater than those of near field light source 118, may be used to write data to the heated area 208 of layer 206. Such a field is designed to write to the media layer 206 at higher temperatures, and will not affect the magnetic state of surrounding magnetic material in layer 206 at lower temperatures, i.e., only the magnetic state of material within heated region 208 will be impacted. The devices and structures required for the magnetic field are not shown in FIG. 2a. A polarized light source 210, polarized in the direction indicated by arrow 116, is directed through transparent dielectric substrate 104', which supports conductive film 102 of thickness t. In this particular embodiment of the present invention, a different dielectric substrate 104 is located within the volume of the ridge aperture. The two materials are distinguished by having two distinctly different dielectric constants. In an alternative embodiment disclosed in FIG. 2b, the same transparent dielectric material 104 is used as both the supporting substrate and the dielectric within the ridge aperture volume. Typically, the ridge aperture and supporting substrate is part of a slider assembly that glides within a distance d of the surface of media substrate 202. As an example, FIG. 9 is a plan view 900 of a simplified recording device in accordance with an embodiment of the present invention. Slider 904, connected to arm 902, is placed proximate to rotating media 202. Slider 904 contains structures such as near field lights sources (not shown), magnetic write heads (not shown), and read heads (not shown).

Figure 2B:
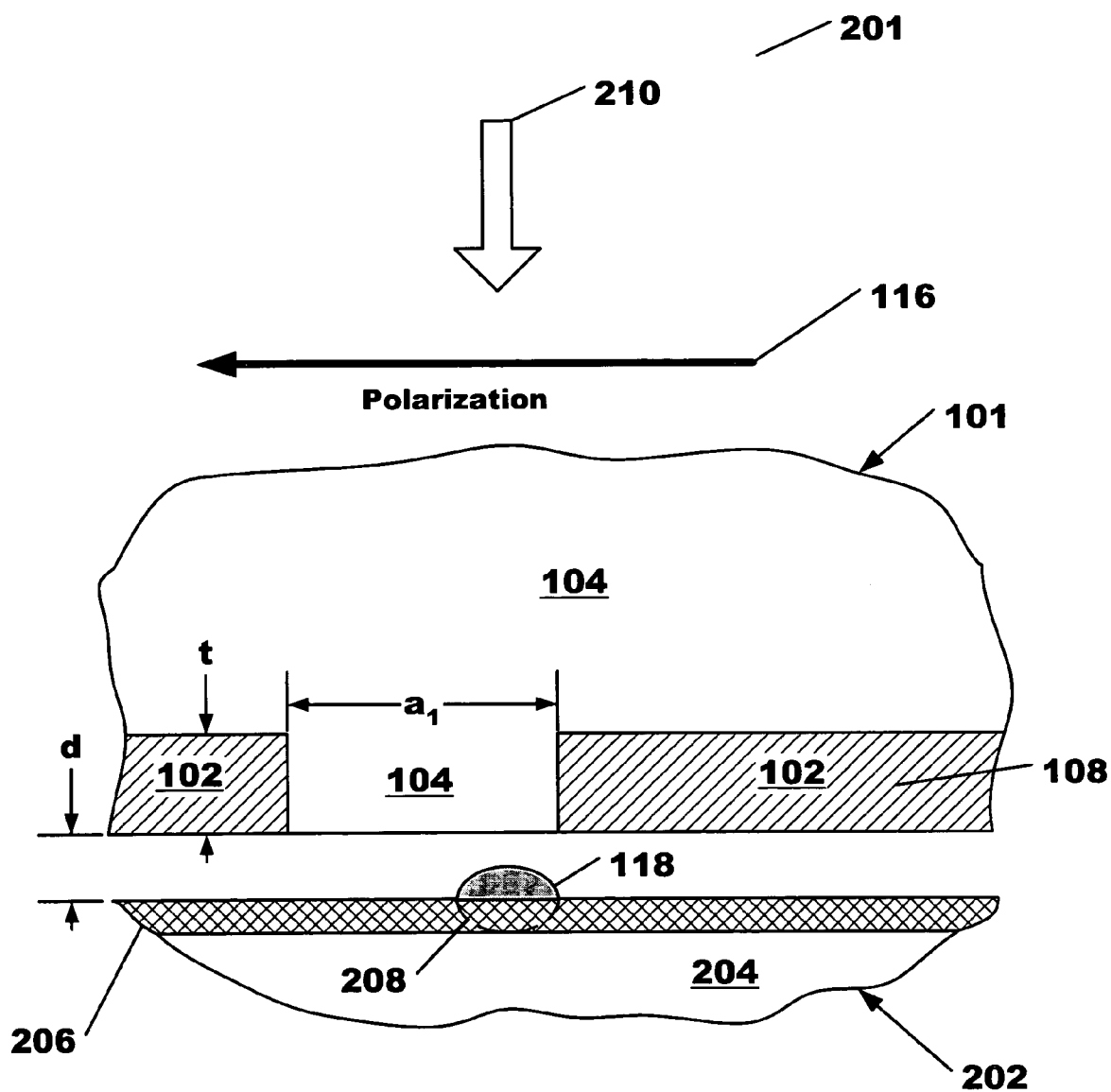
FIG. 2*b* is a partial, cross sectional view through section A-A of FIG. 1*b* showing the heating of a media substrate oriented below the ridge near-field aperture of FIG. 1*b*, for a single dielectric material 104, in accordance with an embodiment of the present invention.

Returning to FIGS. 2a, 2b, an important object of the present invention provides heating of the magnetic recording layer 206 with a light source 210 having a wavelength of 780 nm (+20/−10 nm). This wavelength is desirable because it can be produced with low cost laser diode sources. It is another object of the present invention to provide a ridge aperture having dimensions optimized for the 780 nm wavelength and for maximum energy absorption in magnetic recording layer 206. In order to achieve optimized heat adsorption in the recording layer, a number of variables must be considered beside the wavelength of incident radiation and the various dimensions ($a_1$, $a_2$, $a_3$, $a_4$, t) of the ridge aperture. Most disclosures of the prior art only consider the intensity of the near field light source compared to the intensity of the incident radiation, without consideration of how effective a particular near field source is to heating a substrate. Substrate heating requires consideration of the materials comprising the magnetic recording layer 206, the optical and thermal properties of this layer, and the distance d from the exposed surface of the ridge near field aperture to the surface of the magnetic recording layer 206. Practical considerations may require that the transparent dielectric 104' supporting the conductive film 102 have a higher dielectric constant than the transparent dielectric 104 within the volume of the near field aperture. A higher dielectric constant in the support dielectric 104' makes the optical manipulation and focusing of the light source 210 easier, at the expense of some heating efficiency (disclosed in detail below). For example the higher dielectric constant material may be the core of a thin-film dielectric waveguide used to direct light to the ridge aperture. However, it is also possible to utilize the same dielectric material to support the conductive film 102 and fill the aperture 106, as shown in FIG. 2b. Preferably, the low dielectric constant material 104 is silicon dioxide, and the higher dielectric constant material comprises oxides of tantalum, particularly $Ta_2O_5$.

FIGS. 3-8 illustrate the impact of various dimensional parameters and dielectric materials on the energy adsorption within magnetic recording layer 206, expressed in arbitrary units (a.u.). For comparison, 6.0 a.u. is equivalent to an adsorbed surface power density of about $5\times10^{-4}$ mW/nm$^3$, produced from an incident power density of 100 mW/μm$^2$ at 780 nm. The following results are obtained for magnetic recording layer 206 containing alloys of cobalt, although alloys of iron may also be used. Conductive film 102 may be chosen from Au, Ag, Cu, Al, and their alloys, but Au is preferred. For the results reported, distance d is about 8 nm. Preferably d is between 6 and 12 nm.

Figure 3:
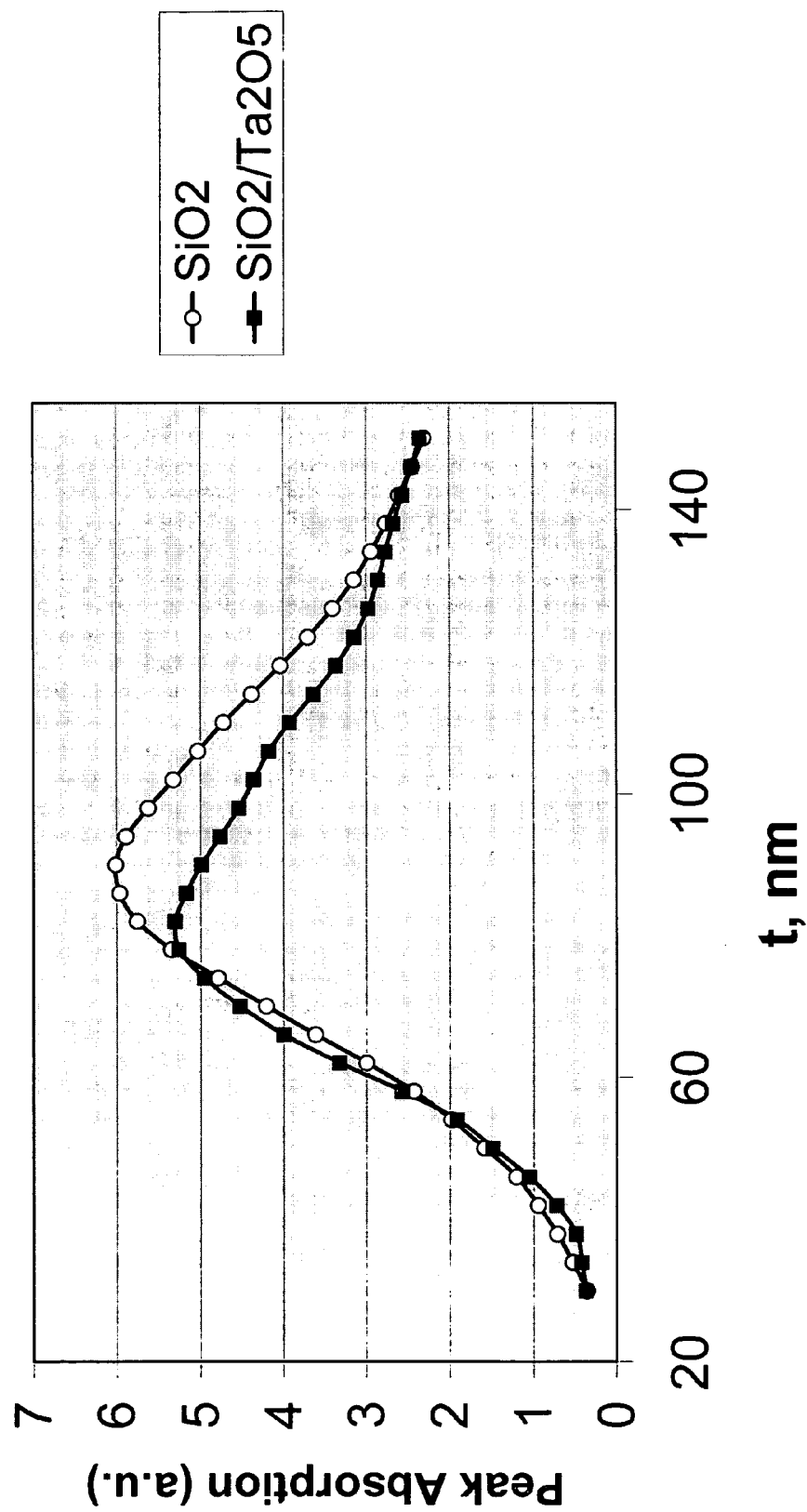
FIG. 3 is a chart of peak absorption in the magnetic recording layer versus conductive film thickness for silica and silica/tantalum oxide dielectrics, in accordance with an embodiment of the present invention.

FIG. 3 is a chart of peak absorption at 780 nm in the magnetic recording layer 206 versus conductive film thickness t for silica and silica/tantalum oxide dielectrics, in accordance with an embodiment of the present invention. Two curves are presented in this chart, the curve having open circles represent results with silicon dioxide as both the supporting dielectric and the dielectric within the near field aperture, as shown in FIG. 2b. The curve having dark squares represents results with a tantalum pentoxide supporting dielectric 104' and a silicon dioxide dielectric 104 within the aperture, as shown in FIG. 2a. The curve having open circles will henceforth be referred to as the single dielectric case, the curve having dark squares being henceforth referred to as the dual dielectric case. As can be seen from the chart in FIG. 3, the single dielectric case produces a maximum peak adsorption of about 6 a.u. at a gold film thickness of about 90 nm. The dual dielectric case produces a somewhat lower peak adsorption level of about 5.3 a.u. at about 82 nm. Preferably, it is desirable to maintain peak adsorption levels above about 3 a.u., more preferably above 4 a.u., most preferably above 5 a.u. The gold film thickness is preferably between 62 and 130 nm, more preferably between 66 and 118 nm, and most preferably between 74 and 106 nm.

Figure 4:
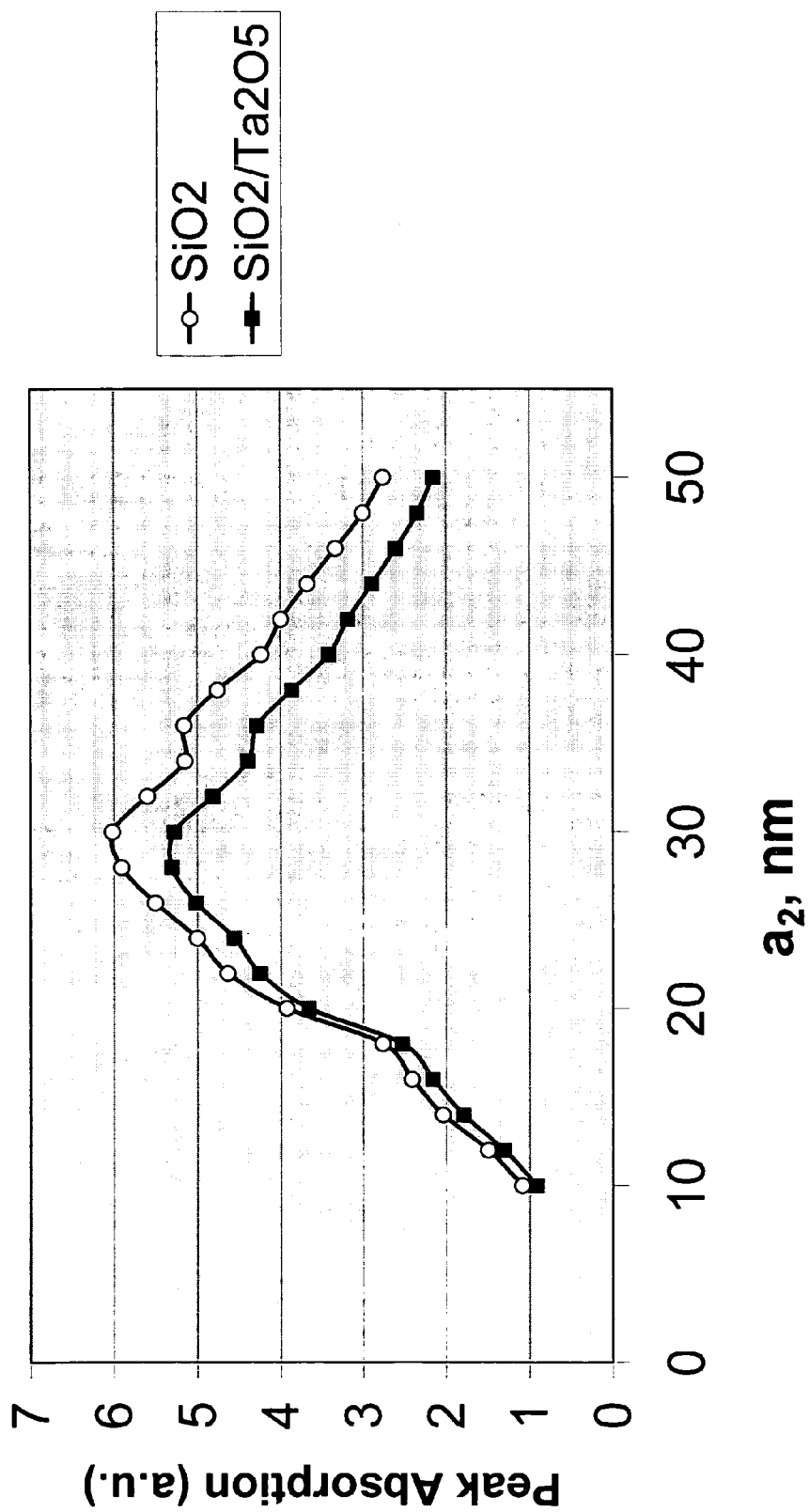
FIG. 4 is a chart of peak absorption in the magnetic recording layer versus dimension $a_2$ of the ridge near-field aperture for silica and silica/tantalum oxide dielectrics, in accordance with an embodiment of the present invention.

FIG. 4 is a chart of peak absorption at 780 nm in the magnetic recording layer 206 versus dimension $a_2$ of the ridge near-field aperture for silica and silica/tantalum oxide dielectrics, in accordance with an embodiment of the present invention. As in FIG. 3, results of the single dielectric case is represented by the curve having open circles, the dual dielectric case the curve represented by dark squares. As can be seen from the chart in FIG. 4, the single dielectric case produces a maximum peak adsorption of about 6 a.u. at a dimension $a_2$ of about 30 nm. The dual dielectric case produces a somewhat lower peak adsorption level of about 5.3 a.u. at about 28 nm. Preferably, it is desirable to maintain peak adsorption levels above about 3 a.u., more preferably above 4 a.u., most preferably above 5 a.u. The dimension $a_2$ is preferably between 18 and 48 nm, more preferably between 20 and 42 nm, and most preferably between 24 and 36 nm.

Figure 5:
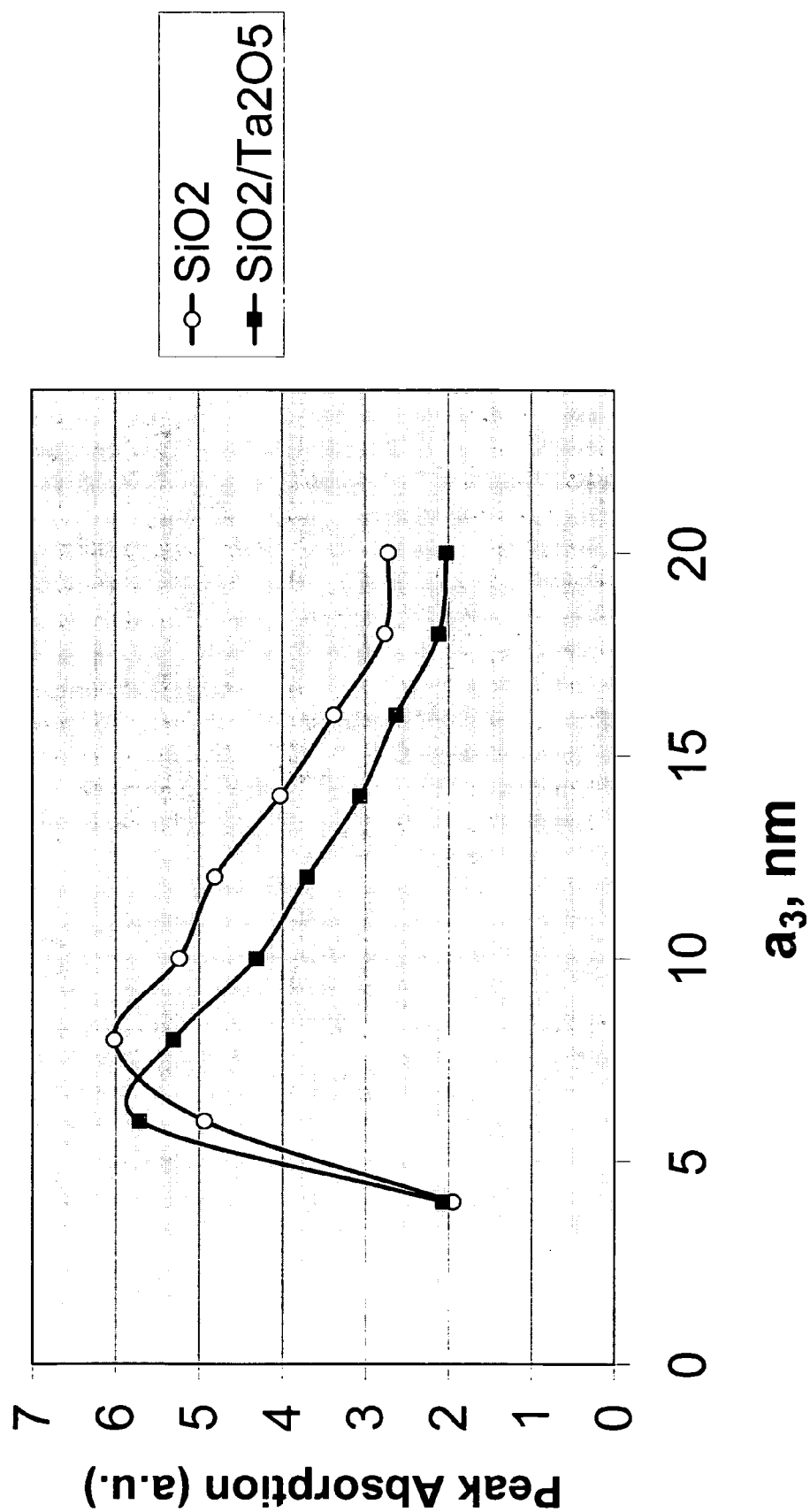
FIG. 5 is a chart of peak absorption in the magnetic recording layer versus dimension $a_3$ of the ridge near-field aperture for silica and silica/tantalum oxide dielectrics, in accordance with an embodiment of the present invention.

FIG. 5 is a chart of peak absorption at 780 nm in the magnetic recording layer 206 versus dimension $a_3$ of the ridge near-field aperture for silica and silica/tantalum oxide dielectrics, in accordance with an embodiment of the present invention. As in FIG. 3, results of the single dielectric case is represented by the curve having open circles, the dual dielectric case the curve represented by dark squares. As can be seen from the chart in FIG. 5, the single dielectric case produces a maximum peak adsorption of about 6 a.u. at a dimension $a_3$ of about 8 nm. The dual dielectric case produces a somewhat lower peak adsorption level of about 5.7 a.u. at about 6 nm. Preferably, it is desirable to maintain peak adsorption levels above about 3 a.u., more preferably above 4 a.u., most preferably above 5 a.u. The dimension $a_3$ is preferably between 5 and 20 nm, more preferably between 5 and 14 nm, and most preferably between 6 and 12 nm. Preferably, $a_3$ is greater than or equal to dimension d.

Figure 6:
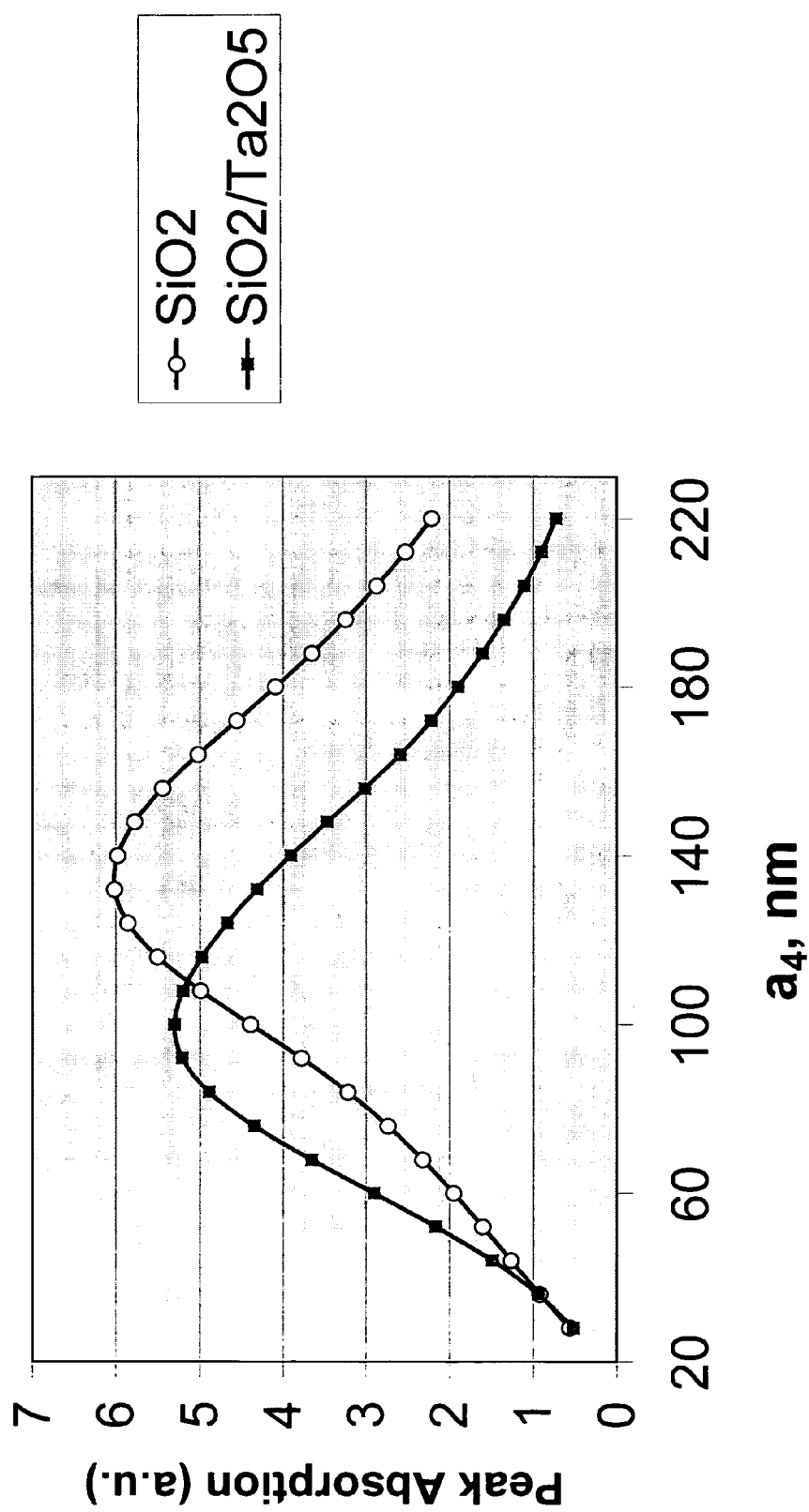
FIG. 6 is a chart of peak absorption in the magnetic recording layer versus dimension $a_4$ of the ridge near-field aperture for silica and silica/tantalum oxide dielectrics, in accordance with an embodiment of the present invention.

FIG. 6 is a chart of peak absorption at 780 nm in the magnetic recording layer 206 versus dimension $a_4$ of the ridge near-field aperture for silica and silica/tantalum oxide dielectrics, in accordance with an embodiment of the present invention. As in FIG. 3, results of the single dielectric case is represented by the curve having open circles, the dual dielectric case the curve represented by dark squares. As can be seen from the chart in FIG. 6, the single dielectric case produces a maximum peak adsorption of about 6 a.u. at a dimension $a_4$ of about 132 nm. The dual dielectric case produces a somewhat lower peak adsorption level of about 5.3 a.u. at about 100 nm. Preferably, it is desirable to maintain peak adsorption levels above about 3 a.u., more preferably above 4 a.u., most preferably above 5 a.u. The dimension $a_4$ is preferably between 68 and 196 nm, more preferably between 76 and 180 nm, and most preferably between 92 and 164 nm.

Figure 7:
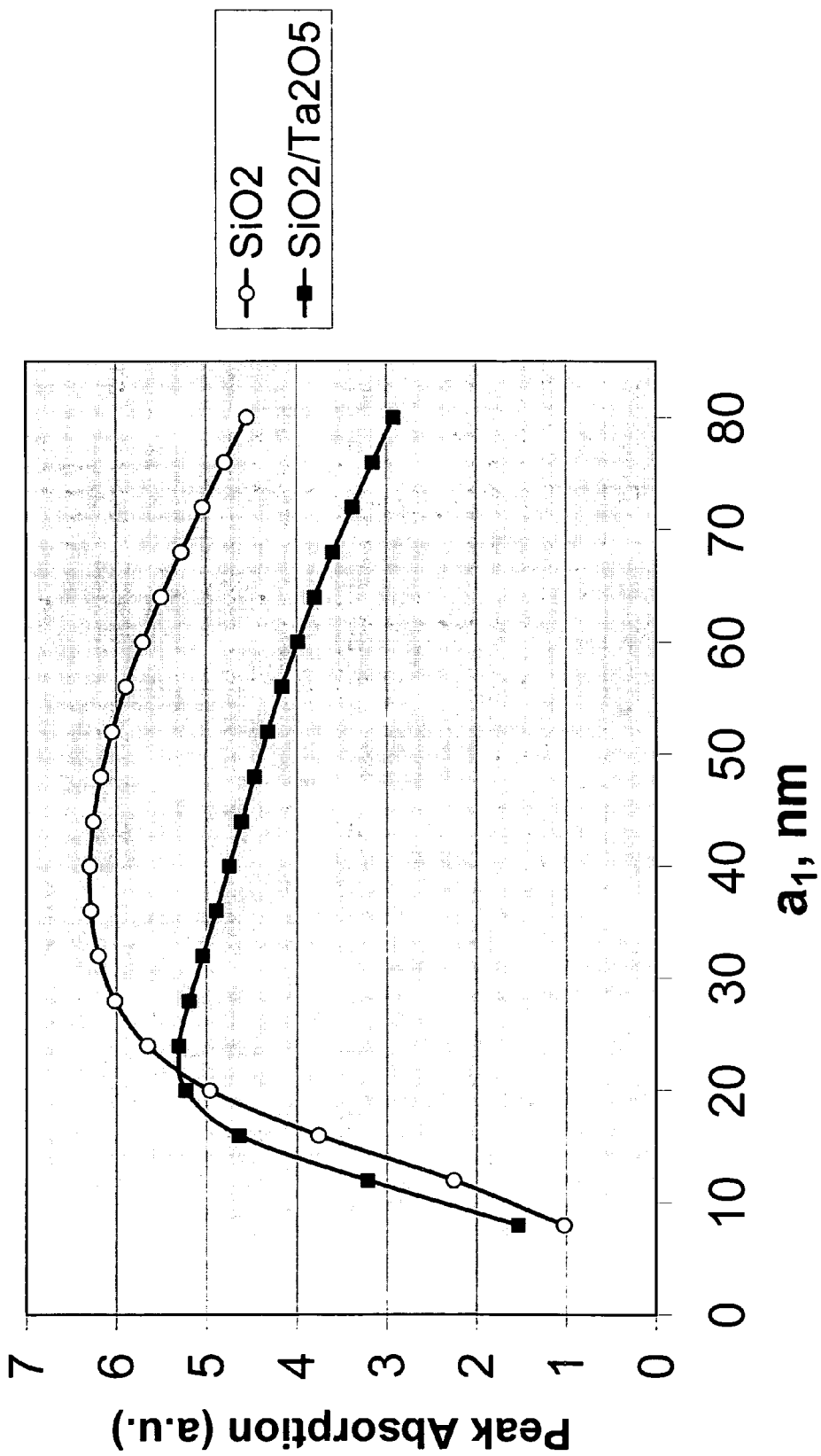
FIG. 7 is a chart of peak absorption in the magnetic recording layer versus dimension $a_1$ of the ridge near-field aperture for silica and silica/tantalum oxide dielectrics, in accordance with an embodiment of the present invention.

FIG. 7 is a chart of peak absorption at 780 nm in the magnetic recording layer 206 versus dimension $a_1$ of the ridge near-field aperture for silica and silica/tantalum oxide dielectrics, in accordance with an embodiment of the present invention. As in FIG. 3, results of the single dielectric case is represented by the curve having open circles, the dual dielectric case the curve represented by dark squares. As can be seen from the chart in FIG. 7, the single dielectric case produces a maximum peak adsorption of about 6.3 a.u. at a dimension $a_1$ of about 40 nm. The dual dielectric case produces a somewhat lower peak adsorption level of about 5.3 a.u. at about 24 nm. Preferably, it is desirable to maintain peak adsorption levels above about 3 a.u., more preferably above 4 a.u., most preferably above 5 a.u. The dimension $a_1$ is preferably between 12 and 80 nm, more preferably between 16 and 80 nm, and most preferably between 20 and 72 nm.

Figure 8:
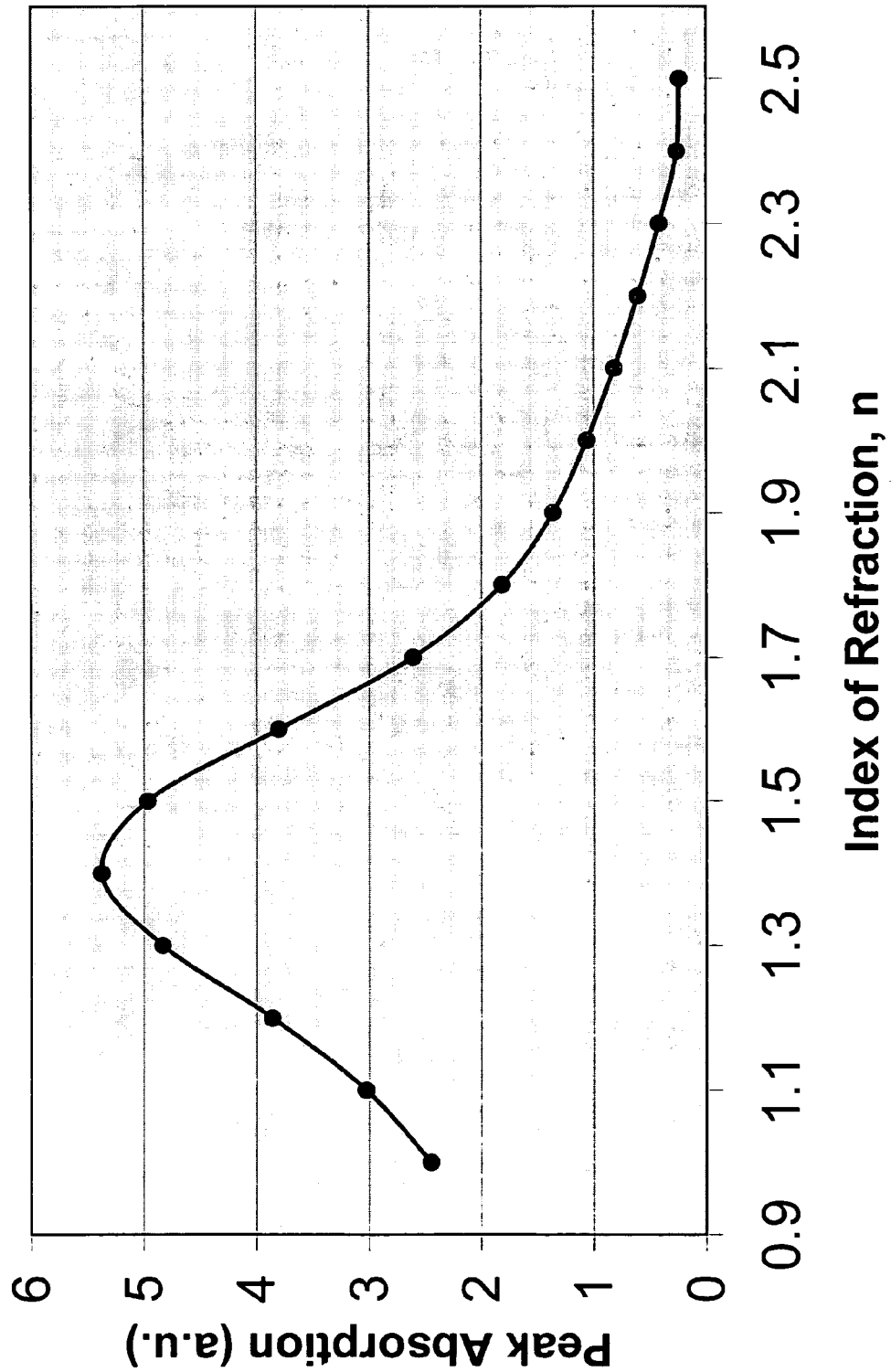
FIG. 8 is a chart of peak absorption in the magnetic recording layer versus the index of refraction of the dielectric within the volume of a ridge near-field aperture, in accordance with an embodiment of the present invention; and, FIG. 9 is a plan view of a simplified recording device in accordance with an embodiment of the present invention.

FIG. 8 is a chart of peak absorption at 780 nm in the magnetic recording layer 206 versus the index of refraction of the dielectric within the volume of a ridge near-field aperture, in accordance with an embodiment of the present invention. This chart illustrates why only silica is preferred as the transparent dielectric within the aperture volume. The peak absorption occurs at an index of 1.4, matching that of silica. Tantalum pentoxide, with an index of about 2.1, would produce a significantly degraded peak absorption level of only about 0.8 a.u.

The present invention is not limited by the previous embodiments heretofore described. Rather, the scope of the present invention is to be defined by these descriptions taken together with the attached claims and their equivalents.

What is claimed is:

1. An optical recording device comprising:
    a conductive metal film;
    a ridge aperture fashioned in said conductive metal film;
    a light source producing light having wavelengths between 770 and 800 nm, said light source illuminating at least a portion of said ridge aperture;
    a media substrate proximate to said conductive metal film, wherein said light source produces an adsorbed surface power density greater than $2 \times 10^{-4}$ mW/nm$^3$ within said media substrate, said light source having an incident power density of 100 mW/μm$^2$.

2. The device as recited in claim 1, wherein said conductive metal film is supported on a first transparent dielectric material, said conductive metal film having a thickness and an exposed surface.

3. The device as recited in claim 2, wherein a distance between said exposed surface of said conductive metal film and an opposing surface of said media substrate is between 6 and 12 nm.

4. The device as recited in claim 2, wherein a volume of said ridge aperture is filled with said first transparent dielectric material, said volume being defined by an open cross sectional area of said ridge aperture and said thickness of said conductive film.

5. The device as recited in claim 4, wherein said first transparent dielectric material comprises oxides of silicon.

6. The device as recited in claim 2, wherein a volume of said ridge aperture is filled with a second transparent dielectric material, said volume being defined by an open cross sectional area of said ridge aperture and said thickness of said conductive film.

7. The device as recited in claim 6, wherein said second transparent dielectric material comprises oxides of silicon, and said first transparent dielectric material has a dielectric constant greater than said second transparent dielectric material.

8. The device as recited in claim 7, wherein said first transparent dielectric material comprises oxides of tantalum.

9. The device as recited in claim 2, wherein said conductive metal film comprises gold, said thickness between 62 and 130 nm.

10. The device as recited in claim 1, wherein
    said ridge aperture has dimensions $a_1$, $a_2$, $a_3$, and $a_4$;
    said dimension $a_1$ being between 12 and 80 nm;
    said dimension $a_2$ being between 18 and 48 nm;
    said dimension $a_3$ being between 5 and 20 nm; and,
    said dimension $a_4$ being between 68 and 196 nm.

11. The device as recited in claim 1, wherein
    said ridge aperture has dimensions $a_1$, $a_2$, $a_3$, and $a_4$;
    said dimension $a_1$ being between 20 and 72 nm;
    said dimension $a_2$ being between 24 and 36 nm;
    said dimension $a_3$ being between 6 and 12 nm; and,
    said dimension $a_4$ being between 92 and 164 nm.

12. The device as recited in claim 1, wherein said media substrate comprises alloys of cobalt.

13. A method for thermally assisted recording comprising;
    fashioning a ridge aperture within a conductive metal film;

illuminating at least a portion of said ridge aperture with light having a wavelength between 770 and 800 nm;
producing a near-field light source with said ridge aperture; and,
heating a media substrate proximate to said conductive film with said near-field light source, said near-field light source producing an adsorbed surface power density greater than $2\times10^4$ mW/nm$^3$ within said media substrate, with an incident light power density of 100 mW/μm$^2$.

14. The method as recited in claim 13, wherein said conductive metal film is supported on a first transparent dielectric material, said conductive metal film having a thickness and an exposed surface.

15. The method as recited in claim 14, wherein a distance between said exposed surface of said conductive metal film and an opposing surface of said media substrate is between 6 and 12 nm.

16. The method as recited in claim 14, wherein a volume of said ridge aperture is filled with said first transparent dielectric material, said volume being defined by an open cross sectional area of said ridge aperture and said thickness of said conductive film.

17. The method as recited in claim 16, wherein said first transparent dielectric material comprises oxides of silicon.

18. The method as recited in claim 14, wherein a volume of said ridge aperture is filled with a second transparent dielectric material, said volume being defined by an open cross sectional area of said ridge aperture and said thickness of said conductive film.

19. The method as recited in claim 18, wherein said second transparent dielectric material comprises oxides of silicon, and said first transparent dielectric material has a dielectric constant greater than said second transparent dielectric material.

20. The method as recited in claim 19, wherein said first transparent dielectric material comprises oxides of tantalum.

21. The method as recited in claim 14, wherein said conductive metal film comprises gold, said thickness between 62 and 130 nm.

22. The method as recited in claim 13, wherein
said ridge aperture has dimensions $a_1$, $a_2$, $a_3$, and $a_4$;
said dimension $a_1$ being between 12 and 80 nm;
said dimension $a_2$ being between 18 and 48 nm;
said dimension $a_3$ being between 5 and 20 nm; and,
said dimension $a_4$ being between 68 and 196 nm.

23. The method as recited in claim 13, wherein
said ridge aperture has dimensions $a_1$, $a_2$, $a_3$, and $a_4$;
said dimension $a_1$ being between 20 and 72 nm;
said dimension $a_2$ being between 24 and 36 nm;
said dimension $a_3$ being between 6 and 12 nm; and,
said dimension $a_4$ being between 92 and 164 nm.

24. The method as recited in claim 13, wherein said media substrate comprises alloys of cobalt.

* * * * *